(12) United States Patent
Yururi

(10) Patent No.: US 8,042,191 B2
(45) Date of Patent: Oct. 18, 2011

(54) IMAGE CAPTURE APPARATUS

(75) Inventor: Hitoshi Yururi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 673 days.

(21) Appl. No.: 12/033,355

(22) Filed: Feb. 19, 2008

(65) Prior Publication Data

US 2008/0205642 A1    Aug. 28, 2008

(30) Foreign Application Priority Data

Feb. 20, 2007 (JP) ................. 2007-040002

(51) Int. Cl.
*G06F 21/00* (2006.01)
(52) U.S. Cl. .................... 726/27; 713/168; 380/229
(58) Field of Classification Search .............. 726/27; 713/165, 168, 172; 380/229, 200
See application file for complete search history.

(56) References Cited

U.S. PATENT DOCUMENTS

| 5,862,217 | A | * | 1/1999 | Steinberg et al. ............ 713/176 |
| 6,122,379 | A | * | 9/2000 | Barbir ........................ 380/269 |
| 7,123,296 | B2 | | 10/2006 | Misawa |
| 7,136,487 | B1 | * | 11/2006 | Schon et al. ................ 380/229 |
| 7,779,267 | B2 | * | 8/2010 | Chen et al. ................. 713/185 |
| 2006/0034459 | A1 | * | 2/2006 | Uchikawa .................. 380/255 |
| 2007/0008568 | A1 | * | 1/2007 | Senoh ........................ 358/1.14 |

FOREIGN PATENT DOCUMENTS

| JP | 2000-330797 A | 11/2000 |
| JP | 2001-320668 A | 11/2001 |
| JP | 2001320668 A | * 11/2001 |
| JP | 2002-354318 A | 12/2002 |
| JP | 2003-076611 A | 3/2003 |
| JP | 2006-106940 A | 4/2006 |

\* cited by examiner

*Primary Examiner* — Kambiz Zand
*Assistant Examiner* — Imhotep Durham
(74) *Attorney, Agent, or Firm* — Canon U.S.A., Inc. I.P. Division

(57) ABSTRACT

An image capture apparatus captures an image, and performs an authentication process with an external device. The image capture apparatus encrypts a captured image to generate an encrypted image if the authentication unit succeeds in performing the authentication process, and stores the encrypted image in a recording medium. The image capture apparatus displays whether the authentication unit succeeded in performing the authentication process, and whether the external device includes key information used in encrypting the captured image.

12 Claims, 14 Drawing Sheets

IMAGE CAPTURE APPARATUS

BACKGROUND OF THE INVENTION

1. Field of the Invention

The present invention relates to image capture apparatus, such as a digital camera, that encrypts captured image data and stores the encrypted data in a recording medium.

2. Description of the Related Art

Conventionally, a digital camera that encrypts and stores captured image data has been realized. In a case of data encryption, an encryption key is required to encrypt plain text data. Further, a decryption key is required to decode the encrypted data. An encryption key and a decryption key can be identical depending on an encryption method. Therefore, it is necessary to securely manage either or both of an encryption key and a decryption key, so that the keys are not leaked out to a third party.

An effective method for securely managing the above-described keys is to use an IC (integrated circuit) card which is difficult to be decoded by software or hardware. Japanese Patent Application Laid-Open No. 2001-320668 discusses a digital camera that confidentially stores key data in a storage device such as an IC card and encrypts digital data using the key.

When a key data is read out from a storage device that stores the key data, it is necessary to perform an authentication procedure between the storage device and a digital camera. Authentication prevents a false digital camera that spoofs the digital camera from obtaining key data stored in the storage device. That is, it is required that only the digital camera that knows the correct authentication process can obtain key data, and a third party that does not know the correct authentication procedure cannot obtain key data.

Since a digital camera needs to communicate with a storage device in performing an authentication procedure, some processing time is required.

In a conventional digital camera, after a power switch is turned on, an authentication procedure is started, and an image can be captured only after the authentication procedure ends. Therefore, if a user uses a digital camera that encrypts a captured image, the user needs to wait while an authentication procedure is performed after turning on a power switch before capturing an image. As a result, a user may lose a photo opportunity.

Moreover, a user of a conventional digital camera which encrypts a captured image cannot confirm process steps and result of the authentication procedure. Consequently, an error can occur in which a digital camera stores captured data without performing encryption as desired by a user, due to a failure in loading a device or the like. Further, an error can occur in which a digital camera encrypts a captured image that a user did not wish to encrypt.

SUMMARY OF THE INVENTION

The present invention is directed to an image capture apparatus (e.g., a digital camera) that overcomes the above-described drawbacks or disadvantages. The present invention is directed to an image capture apparatus (e.g., a digital camera) that notifies a user of information about an authentication process and/or an encryption process. The present invention is directed to an image capture apparatus (e.g., a digital camera) that improves a security level of a captured image. The present invention is directed to an image capture apparatus (e.g., a digital camera) that allows changing of timing of an authentication process. Furthermore, the present invention is directed to an image capture apparatus (e.g., a digital camera) that decreases operational error made by a user.

According to an aspect of the present invention, an image capture apparatus includes an image capture unit that captures an image, an authentication unit that performs an authentication process with an external device, an encryption unit that encrypts a captured image to generate an encrypted image if the authentication unit succeeds in performing the authentication process, a storage unit that stores the encrypted image in a recording medium, and a display unit that displays whether the authentication unit succeeded in performing the authentication process, and whether the external device includes key information used in encrypting the captured image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the attached drawings.

First Exemplary Embodiment

Figure 1:
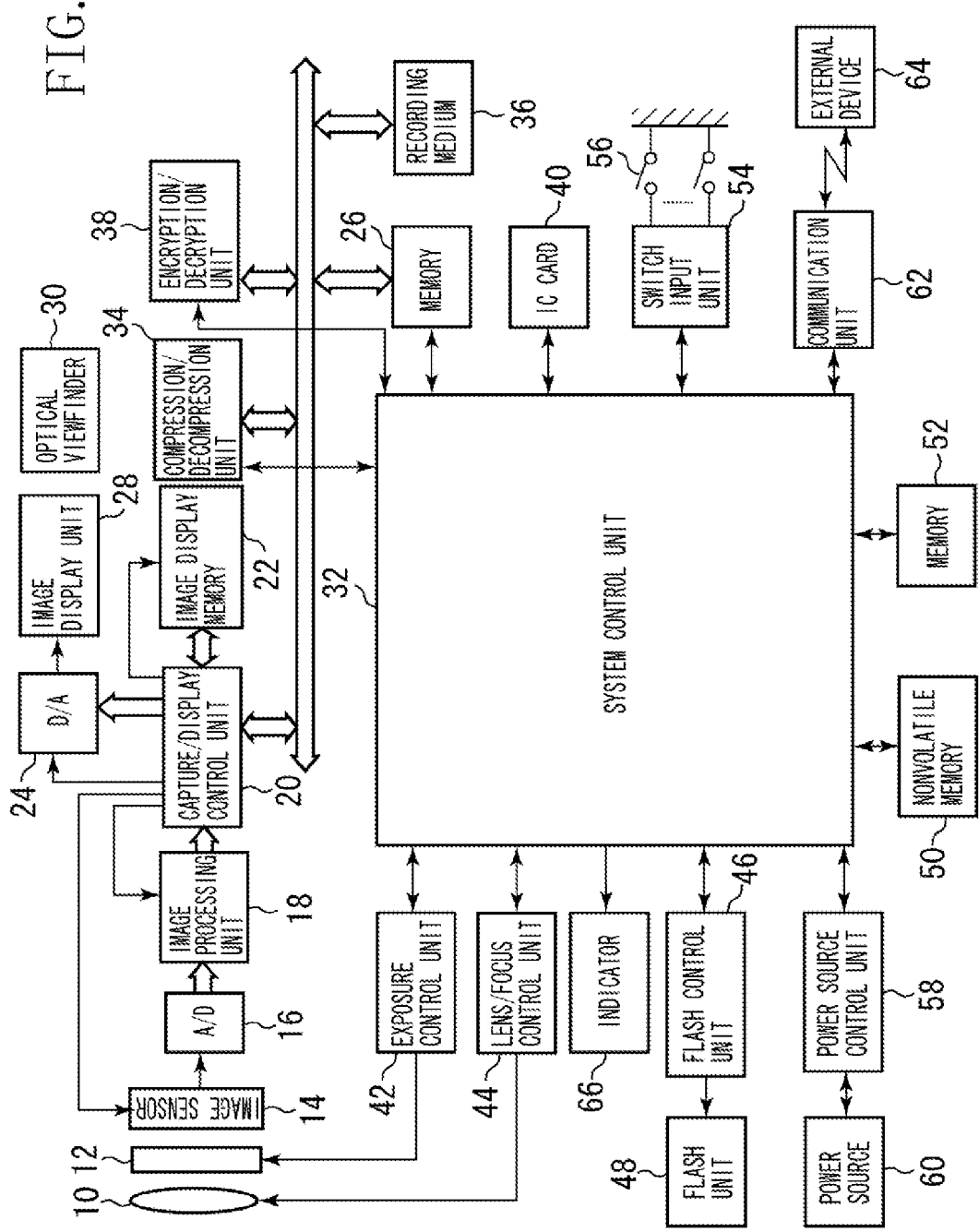
FIG. 1 illustrates a block diagram of a digital camera which is an example of an image capture apparatus according to first, second, and third exemplary embodiments of the present invention.
Figure 2:
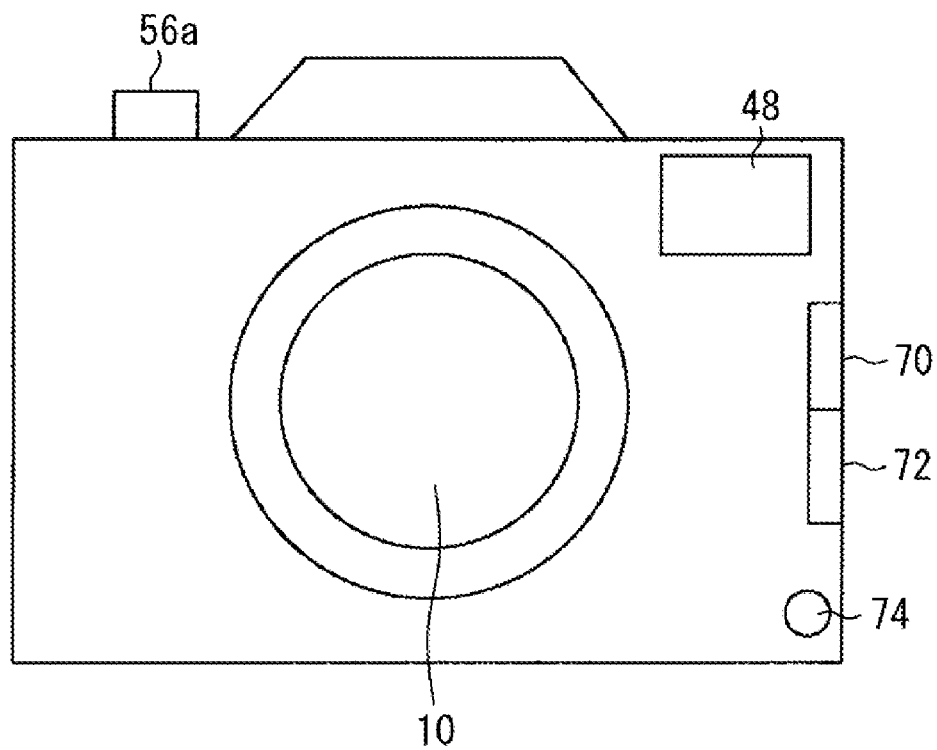
FIG. 2 illustrates a front view of a digital camera according to a first exemplary embodiment of the present invention.
Figure 3:
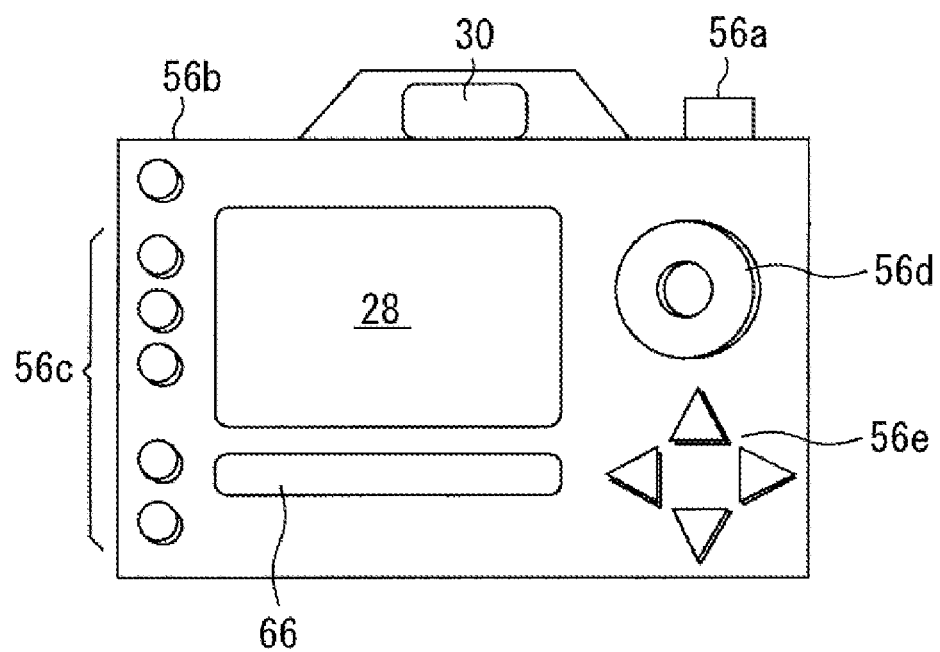
FIG. 3 illustrates a back view of a digital camera according to a first exemplary embodiment of the present invention.

FIG. 1 illustrates a block diagram of a digital camera that is an example of an image capture apparatus according to a first exemplary embodiment of the present invention. Further, FIG. 2 illustrates a front view and FIG. 3 illustrates a back view of a digital camera according to the present exemplary embodiment.

A subject optical image transmitted through a lens 10 and a shutter 12 is focused on an image sensor 14 such as a CCD (charge-coupled device) image sensor. The image sensor 14 converts the optical image formed on the image capturing plane to an electrical image. An A/D (analog/digital) converter 16 converts an analog image signal output from the image sensor 14 to a digital signal. An image processing unit 18 performs a known camera signal processing such as gamma correction on the image data received from the A/D converter 16. The image processing unit 18 can also directly output the image data that is output from the A/D converter 16 without performing such a process.

An image capture/display control unit 20 temporarily stores image data received from the image processing unit 18 in an image display memory 22, and outputs the image data to a D/A (digital/analog) converter 24 for displaying the image data. Further, the image capture/display control unit 20 transfers image data to a memory 26 to record the image data. The D/A converter 24 converts the image data received from the image capture/display control unit 20 into an analog signal and supplies the analog signal to an image display unit 28. The image display unit 28 includes, for example, a LCD (liquid crystal display) panel, and is disposed on a rear of the digital camera. The image capture/display control unit 20 controls the image sensor 14, the A/D converter 16, the image processing unit 18, the D/A converter 24, and the image display memory 22.

The image display unit 28 can be used as an electronic finder, or a display unit for displaying a reproduced image. The digital camera also includes an optical viewfinder 30 for confirming a composition of a subject image.

A system control unit 32 includes a microcomputer that controls each unit of the digital camera illustrated in FIG. 1. The memory 26 is used as a work area for compressing and decompressing image data and for encrypting and decrypting image data. Further, the memory 26 is used as cache area of various data.

A compression/decompression unit 34 is controlled by the system control unit 32 to compress an image data stored in the memory 26. The memory 26 further stores compressed image data that is read out from a recording medium 36 for reproducing the image data, and the compression/decompression unit 34 decompresses the compressed image data under control of the system control unit 32. The compression/decompression function of the compression/decompression unit 34 is realized by hardware, software of a DSP (digital signal processing) apparatus, or a combination of such hardware and software.

An encryption/decryption unit 38 encrypts plain text data such as an image data (generally, an image data compressed by the compression/decompression unit 34) stored in the memory 26 under control of the system control unit 32. The encryption/decryption unit 38 further decrypts the encrypted data, i.e., decodes the data. The encryption/decryption function of the encryption/decryption unit 38 is realized by hardware, software of a DSP (digital signal processing) apparatus, or a combination of such hardware and software.

The recording medium 36 includes a nonvolatile recording medium, e.g., memory card, hard disk device, or an optical disk, that stores image data (or an encrypted image data when the image data is encrypted). In the present exemplary embodiment, the recording medium 36 is detachable. However, the recording medium 36 can be a built-in recording medium.

An IC (integrated circuit) card 40 stores encryption key data used by the encryption/decryption unit 38 in encrypting and decoding data. The system control unit 32 reads out the encryption key data from the IC card 40 only in a case where an authentication procedure is normally completed. In the present exemplary embodiment, the IC card 40 is detachable from the digital camera. However, the IC card 40 can be fixed inside the digital camera. A memory card with an IC card function that includes the functions of the recording medium 36 and the IC card 40 can be used in place of the recording medium 36 and the IC card 40.

An exposure control unit 42 controls the shutter 12. A lens/focus control unit 44 controls focal length, aperture, and optical zoom of the lens 10. A flash control unit 46 controls the luminescence of a flash unit 48 and a luminescence termination function by TTL (through the lens) light modulation.

A nonvolatile memory 50 which electrically deletes and records data, can store data after switching off the power of the digital camera in the present exemplary embodiment. The nonvolatile memory 50 stores body identification information of a digital camera, an image capturing mode set by a user, image capture information, and various parameters. On the other hand, a data stored in a memory 52 is erased when the power of the digital camera is switched off. The memory 52 stores temporal variables that are required in operations of the system control unit 32, and a table for calculation.

Various operation switches 56 are connected to the system control unit 32 via a switch input unit 54. The operation switches 56 include a first release switch that is switched on by half-pressing a shutter button 56a, and a second release switch that is switched on by fully-pressing the shutter button 56a. Both release switches are used in capturing an image. The operation switches 56 further includes a power switch 56b, and operation switches 56c, 56d, and 56e that are image reproducing switch, image forward-feed button, and image back-feed button. When the first release switch is switched on, the system control unit 32 performs photometric control and focus control. When the second release switch is switched on, the system control unit 32 performs a shutter operation and a recording operation that follows the shutter operation. The operation switches 56c, 56d, 56e are used, for example, in instructing an operational mode, or a forward-feed or a back-feed operation on a reproduced image in an image reproducing mode. The operation switches 56a, 56b, 56c, 56d, 56e in the present exemplary embodiment can be of any form, such as a lever, a button, or a dial.

A power source control unit 58 detects the type and status of a power source 60, and controls supplying of power to each unit. The power source 60 includes battery, AC adapter, and a DC-DC converter that generates various DC voltages from a DC output from the battery or an AC adapter.

The system control unit 32 can send information stored in the nonvolatile memory 50, the memory 52, and the recording medium 36 to an external device 64 via a communication unit 62. Further, the system control unit 32 can receive various information from the external device 64. In particular, the communication unit 62 is used in sending and receiving captured data and image data between the system control unit 32 and the external device 64.

The external device 64 includes personal computer, digital camera, printer, and portable information device that can be connected to the communication unit 62.

An indicator 66 notifies a user who is capturing an image, of various shooting information by displaying information in text or icons. Such information includes shooting information about shutter speed, aperture, and ISO sensitivity, number of images that can be captured, and various modes. A display unit similar to the indicator 66 can be disposed on the right or left side, or on the upper or lower part inside the optical view finder 30, or on a top surface of the digital camera (not illustrated in FIGS. 1, 2, and 3). As a result, information that a user wishes to confirm without looking aside from the viewfinder is displayed on an indicator within the optical viewfinder. Additionally, information, such as various settings of the digital camera can be displayed on the indicator 66 on the back or the top surface of the digital camera.

An IC card slot 70 and a memory card slot 72 are disposed on a lateral surface of the digital camera in the present exemplary embodiment. The IC card 40 is inserted into the IC card slot 70. A standard card-size memory card that includes a built-in semiconductor memory or a hard disk is inserted into the memory card slot 72, and used as the recording medium 36. If a memory card that includes an IC card function is inserted into the memory card slot 72, the IC card function of the memory card can be used as the IC card 40.

The external device 64 can be connected to a communication port 74, so that the communication unit 62 that is connected to the external device 64 can communicate with each other. The communication port 74 can be a mechanical connector, or an infrared light or radio wave connecting means.

Figure 4:
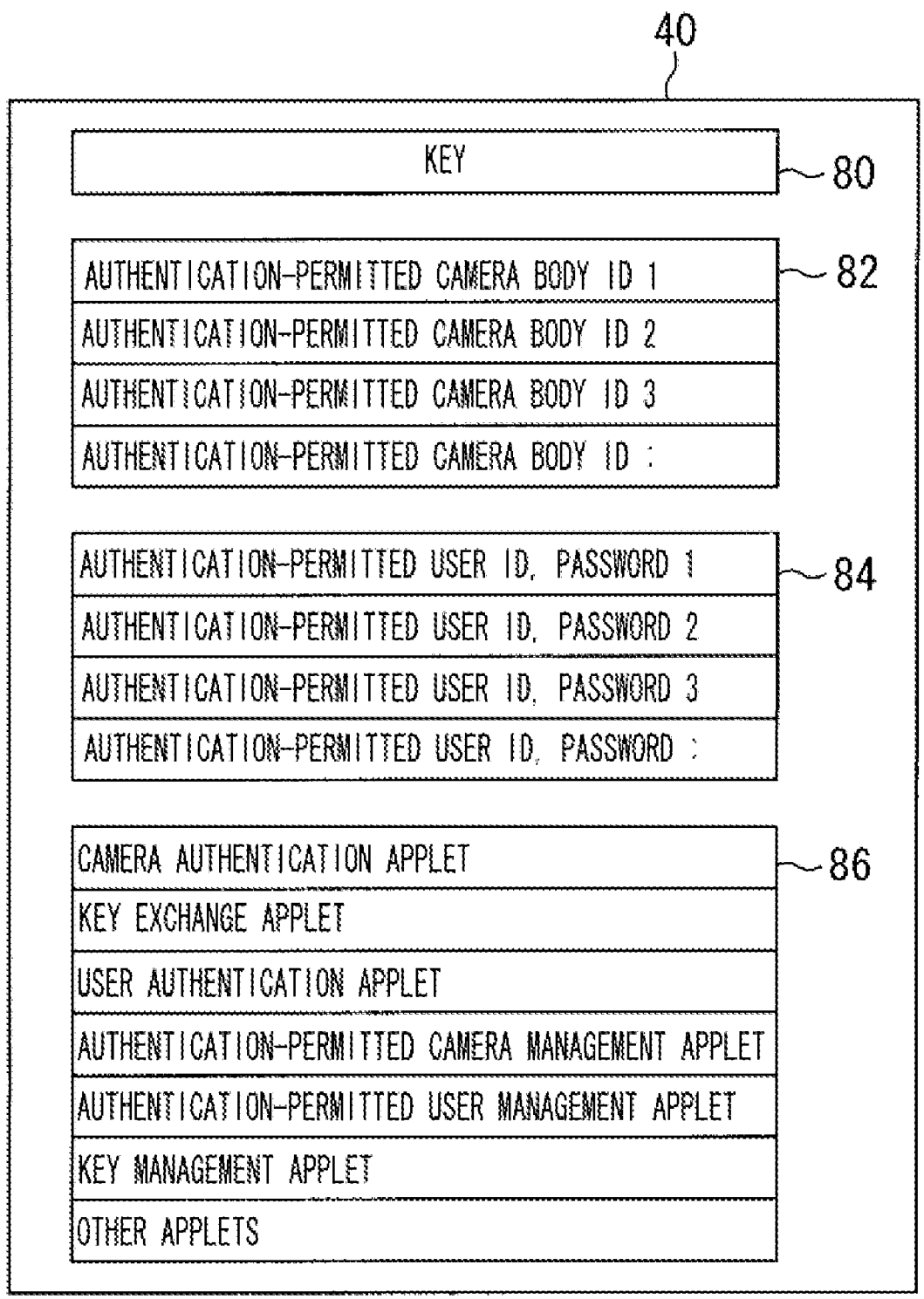
FIG. 4 illustrates an example of information stored in an IC card.

FIG. 4 illustrates an example of information stored in the IC card 40. A key area 80 stores data indicating an encryption key and/or a decryption key. An identification information area 82 stores one or a plurality of body identification number (body ID) that are identification information indicating one or more digital cameras that are permitted authentication. A body ID is denoted, for example, by a combination of a model and a serial number of a digital camera. In the present exemplary embodiment, only a digital camera that is specified by a body ID stored in the identification information area 82 can use a key data and a program stored in the IC card 40.

A user information area 84 stores a user ID and a password of a user who is permitted authentication. Only a user who inputs a user ID and a password that match a user ID and a password stored in the user information area 84 can use the key data and the program stored in the IC card 40.

A program area 86 stores program software, such as various applets used in communication and exchanging of keys between the IC card 40 and devices connected to the IC card 40. For example, a camera authentication applet includes a function for performing authentication between a digital camera and the IC card 40. A key exchange applet includes a function of passing a key stored in the IC card 40 to the digital camera. A user authentication applet includes a function for performing authentication between a user and the IC card 40. An authentication-permitted camera management applet includes a function to manage body ID of authentication-permitted cameras, i.e., a function to add or delete a body ID, and a function to determine whether a body ID is registered. An authentication-permitted user management applet includes a function to manage ID and password of authentication-permitted users, i.e., a function to add and delete user ID and password, and a function to determine whether information about a user ID and a password are registered. A key management applet includes a function to manage a key stored in the IC card 40, i.e., a function to generate or delete a key, and a function to determine whether the key is effective. Other applets include functions other than the above-described functions.

The system control unit 32 executes the camera authentication applet, key exchange applet, key management applet, and authentication-permitted camera management applet when the IC card 40 is loaded in a digital camera of the present exemplary embodiment. A device such as a PC (personal computer) executes the user authentication applet, authentication-permitted camera management applet, authentication-permitted user management applet and key management applet when the IC card 40 is connected to the PC. The IC card 40 stores the above-described information about a body ID and a key of an authentication-permitted camera by previously receiving an instruction from the PC.

FIGS. 5 to 10 illustrate examples of display indicating that authentication is in progress, and authentication results on the image display unit 28 and the indicator 66 of the digital camera.

Figure 5:
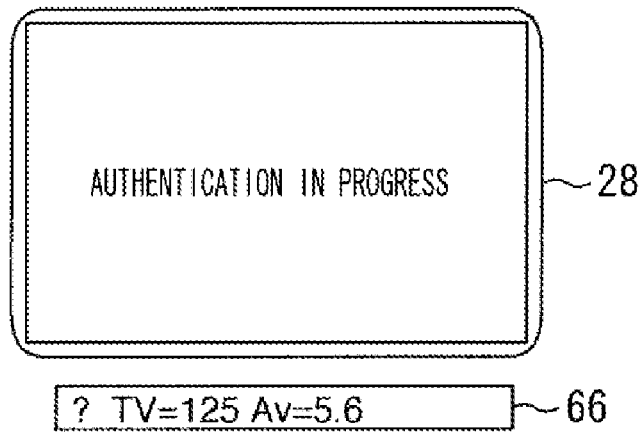
FIG. 5 illustrates an example of a display for notifying a user that an authentication is in progress.

FIG. 5 illustrates a display for notifying a user that an authentication is in progress. The image display unit 28 displays a text indicating that authentication is in progress. The indicator 66 displays a symbol or an icon (in the example of FIG. 6, "?" on the left end of an indicator 66) indicating that authentication is in progress.

Figure 6:
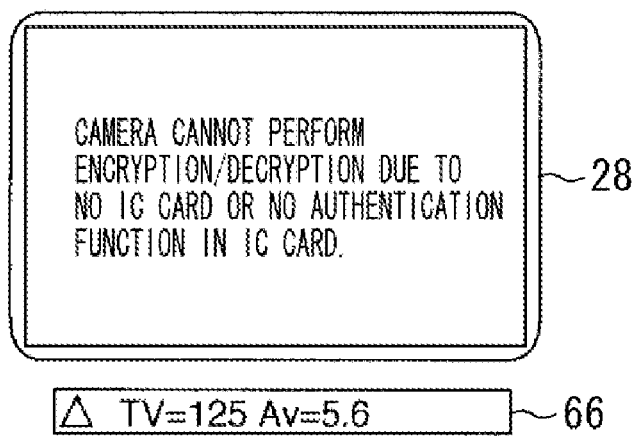
FIG. 6 illustrates an example of a display for notifying a user of an authentication result, i.e., that a card is invalid.

FIG. 6 illustrates a display for notifying a user of an authentication result that an IC card or a device loaded in the digital camera is invalid. The image display unit 28 displays a text indicating that the card or device is invalid. The indicator 66 displays a symbol or an icon (in the example of FIG. 6, "Δ" on the left end of an indicator 66) indicating that the card or device is invalid.

Figure 7:
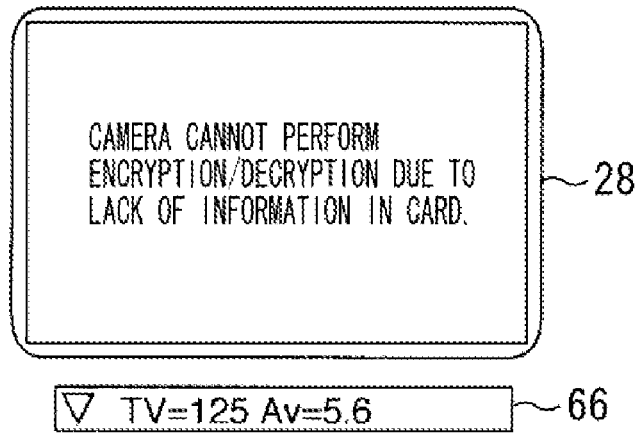
FIG. 7 illustrates an example of a display for notifying a user of an authentication result, i.e., that a card is an initialized card.

FIG. 7 illustrates a display for notifying a user of an authentication result that the card is initialized. The image display unit 28 displays a text indicating that the card is initialized. The indicator 66 displays a symbol or an icon (in the example of FIG. 7, "∇" on the left end of an indicator 66) indicating that the card is initialized.

Figure 8:
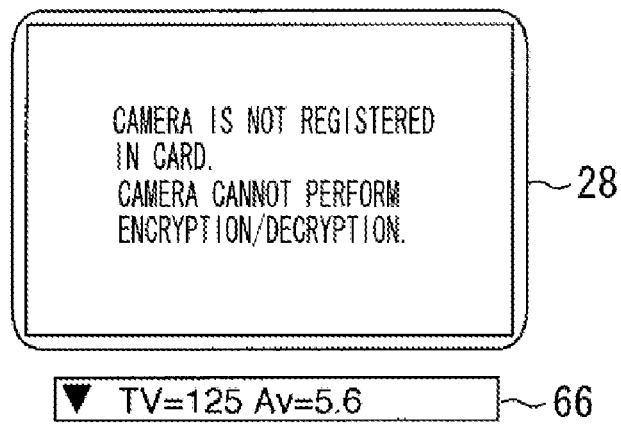
FIG. 8 illustrates an example of a display for notifying a user of an authentication result, i.e., that camera is not registered.

FIG. 8 illustrates a display for notifying a user of an authentication result that the camera is not registered. The image display unit 28 displays a text indicating that the camera is not registered. The indicator 66 displays a symbol or an icon (in the example of FIG. 8, "▼" on the left end of an indicator 66) indicating that the camera is not registered.

Figure 9:
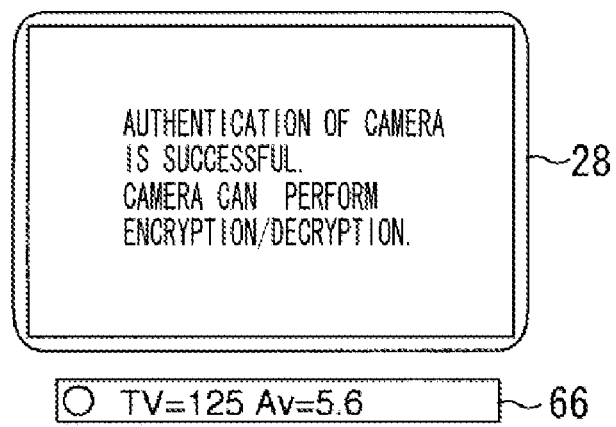
FIG. 9 illustrates an example of a display for notifying a user of an authentication result, i.e., that encryption is enabled.

FIG. 9 illustrates a display for notifying a user of an authentication result that the camera can perform encryption. The image display unit 28 displays a text indicating that the camera can perform encryption. The indicator 66 displays a symbol or an icon (in the example of FIG. 9, "○" on the left end of an indicator 66) indicating that the camera can perform encryption.

Figure 10:
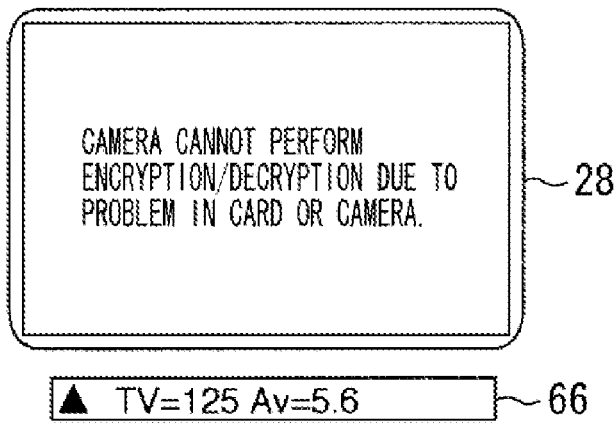
FIG. 10 illustrates an example of a display for notifying a user of an authentication result, i.e., that there is device failure.

FIG. 10 illustrates a display for notifying a user of an authentication result that there is a device failure. The image display unit 28 displays a text indicating that there is device failure. The indicator 66 displays a symbol or an icon (in the example of FIG. 10, "▲" on the left end of an indicator 66) indicating that there is a device failure.

Figure 11:
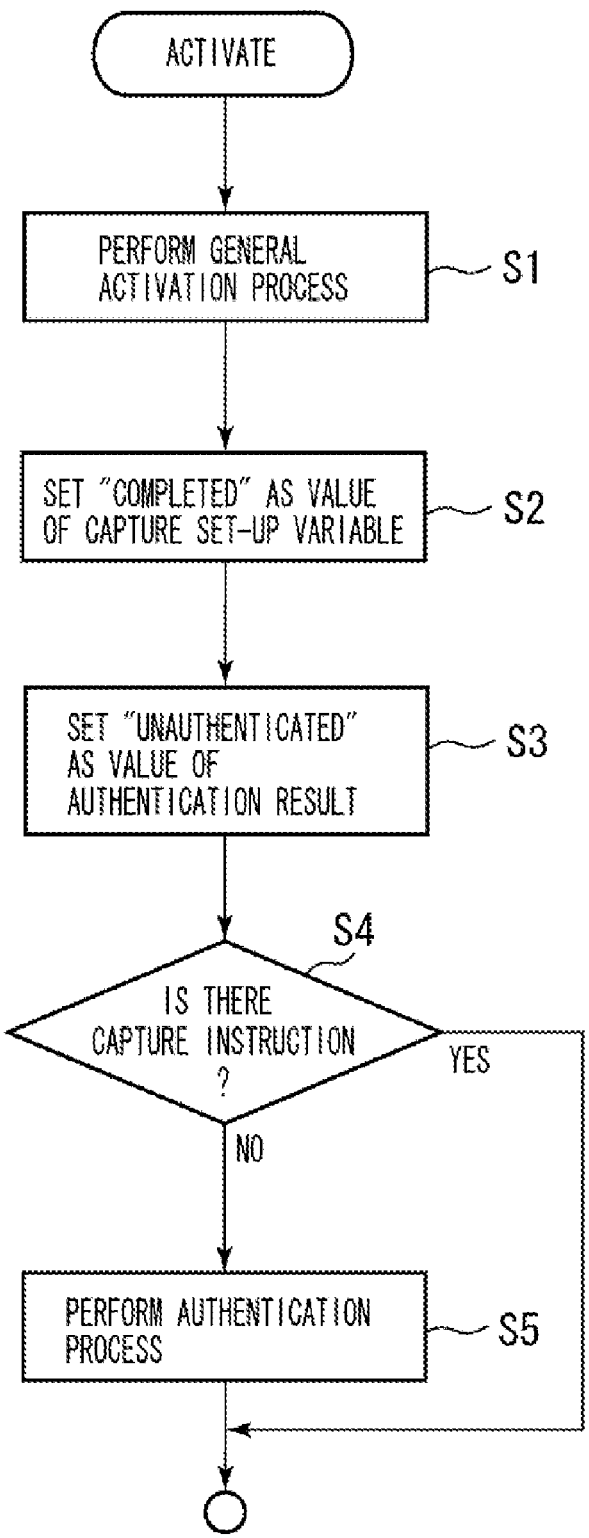
FIG. 11 is a flowchart illustrating an activation process according to a first exemplary embodiment of the present invention.

FIG. 11 is a flowchart illustrating an activation process of a digital camera that is an activation procedure of the present exemplary embodiment. An activation process is performed when a digital camera is switched on, and includes various initialization processes that are required to be performed when the digital camera transits to a state in which the digital camera can capture an image. Followings are steps for the processes.

In step S1, the system control unit 32 executes a general activation process for a digital camera. For example, the system control unit 32 supplies power to the various units illustrated in FIG. 1. The system control unit 32 activates software stored in a nonvolatile memory 50, and the software initializes various variables. Such processes are generally performed by an electronic device, e.g., the activation processes performed by a general digital camera.

In step S2, the system control unit 32 sets a value indicating "completed" in an image capture set-up variable that represents the status of the image capture set-up. The capture set-up variable is initialized to be an invalid value in step S1.

In step S3, the system control unit 32 sets a value indicating "unauthenticated" to an authentication result variable that represents an authentication result.

In step S4, the system control unit 32 detects a value of a variable that indicates whether there is a image capture instruction (i.e., a image capture instruction variable). The capture instruction variable is initialized by a value indicating "capture not instructed" in step S1. If the value of the capture instruction variable indicates "capture instructed" (YES in step S4), the system control unit 32 ends the activation process. On the other hand, if the value of the capture instruction variable indicates "capture not instructed" (NO in step S4), the system control unit 32 performs an authentication process in step S5.

After the process of step S2 ends, the digital camera of the present exemplary embodiment is able to capture an image. In such a state, an image capturing process (illustrated in the flowchart of FIG. 13) is in an executable state as a different task or a process. Therefore, the value of the image capture instruction variable can indicate "capture instructed" before performing the process of step S4.

In step S5, the system control unit 32 performs an authentication process. That is, the digital camera of the present exemplary embodiment communicates with the IC card 40 and performs mutual authentication to determine whether the digital camera and the IC card 40 can both be used.

Figure 12:
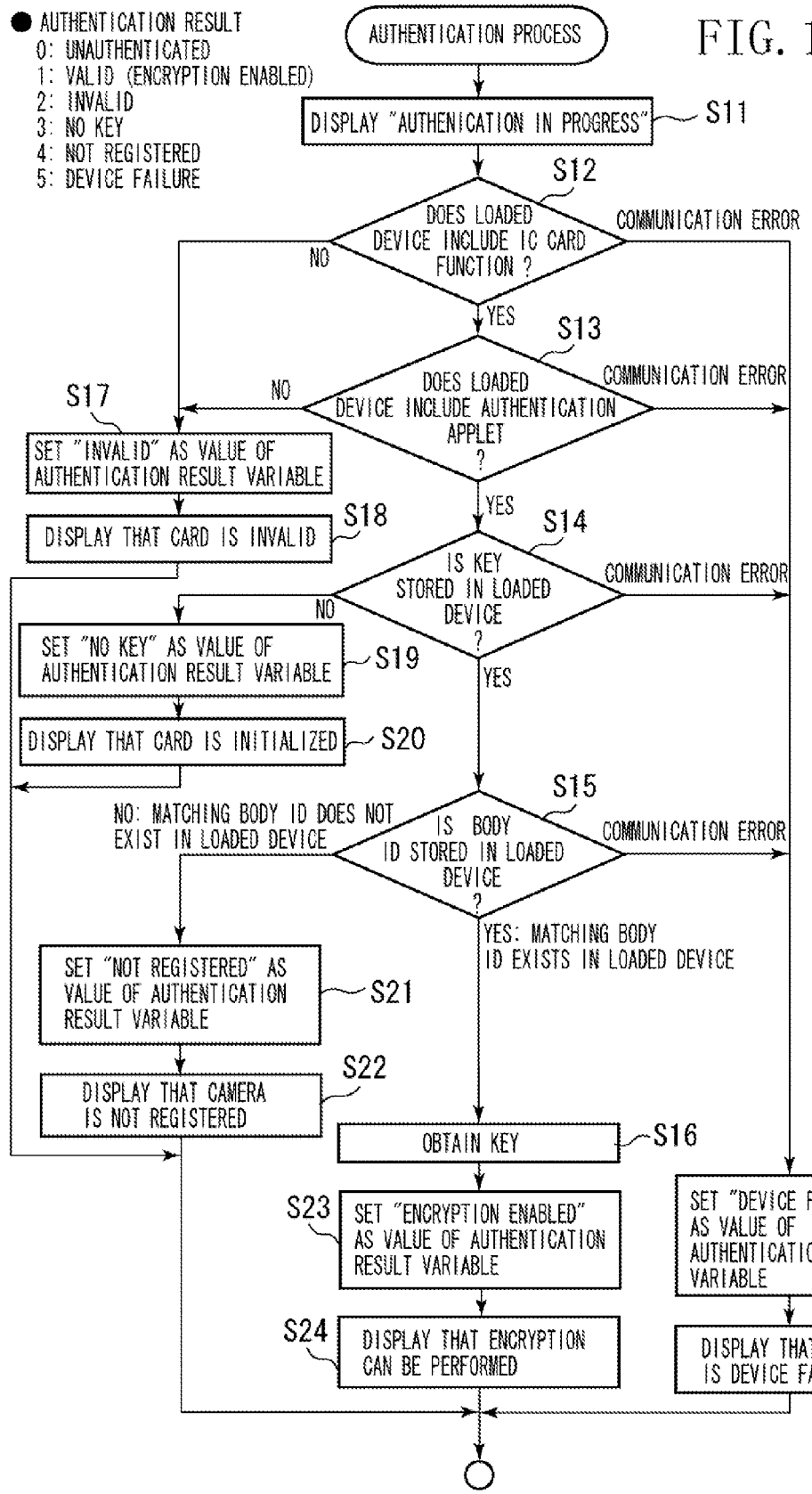
FIG. 12 is a flowchart illustrating an authentication process according to a first exemplary embodiment of the present invention.

FIG. 12 is a flowchart illustrating in detail the authentication process performed in step S5 of the flowchart illustrated in FIG. 11. The authentication process is a process which allows a digital camera to obtain a key data stored in the IC card 40. The process is performed by the system control unit 32.

In step S11, the system control unit 32 displays a status of the authentication on the image display unit 28 and the indicator 66. In the example of the flowchart illustrated in FIG. 12, the status of the authentication is "authentication in progress", and the image display unit 28 and the indicator 66 display information as illustrated in FIG. 5.

In step S12, the system control unit 32 determines whether a device loaded in the digital camera includes an IC card function. That is, the system control unit 32 determines whether the recording medium 36, the IC card 40, or a device loaded in the IC card slot 70 or the memory card slot 72 includes an IC card function. The system control unit 32 sends to the loaded device a predetermined IC card command. If there is a response, the system control unit 32 determines that the device includes an IC card function. If there is no response within a predetermined amount of time, the system control unit 32 determines that the device does not include an IC card function. Since the digital camera in the present exemplary embodiment includes a plurality of slots, the slots are searched in order.

If the system control unit 32 determines that there is an IC card function in the device (YES in step S12), the process proceeds to step S13. On the other hand, if the system control unit 32 determines that there is no IC card function in the device (NO in step S12), the process proceeds to step S17. If a communication error is detected in step S12, the process proceeds to step S25.

In step S13, the system control unit 32 determines whether the IC card 40 or the device including an IC card function that is loaded in the digital camera includes a predetermined authentication applet. In the present exemplary embodiment, the system control unit 32 determines whether a camera authentication applet is included in the program area 86 illustrated in FIG. 4. The authentication applet can be confirmed by the digital camera and the IC card 40 which exchange communication data of a predetermined content. For example, the digital camera and the IC card 40 can communicate data that is kept confidential in the digital camera and the IC card 40 and managed such that an outside user or an external device is unaware of the data. The authentication applet can also be confirmed by the digital camera and the IC card 40 performing encrypted communication using an encryption key that is unknown to an outside user. Such encrypted communication is a process that is widely used by electronic devices in which an IC card can be loaded, and further description is omitted.

If the system control unit 32 determines that there is an authentication applet (YES in step S13), the process proceeds to step S14. On the other hand, if there is no authentication applet (NO in step S13), the process proceeds to step S17. If a communication error is detected in step S13, the process proceeds to step S25.

In step S14, the system control unit 32 determines whether a predetermined key is stored in the IC card 40 or a device including an IC card function that is loaded in the digital camera. That is, the system control unit 32 determines whether a key stored in the key area 80 illustrated in FIG. 4 is valid. A validity of a key can be determined using a key management applet in the IC card 40 or the loaded device, from the digital camera.

Namely, the digital camera inquires the key management applet whether there is a valid key. The key management applet determines the content of the key area 80 of the IC card 40 or device including an IC card function that is loaded in the digital camera. If the key is valid, the key management applet returns a response indicating "key stored" to the digital camera. If the key is invalid, the response is "no key". Upon receiving the response of "key stored", the digital camera determines that the key exists (YES in step S14), and the process proceeds to step S15. On the other hand, if the digital camera receives a response of "no key" (NO in step S14), the process proceeds to step S19. If a communication error is detected, the process proceeds to step S25.

In step S15, the system control unit 32 determines whether an ID for identifying a body of a digital camera, i.e., a body ID, is stored in the IC card 40 or a device including an IC card function that is loaded in the digital camera. That is, the system control unit 32 determines whether there is a body ID that is of a same value as a body ID of the digital camera, in the identification information area 82 of the IC card 40. The system control unit 32 make the determination using an authentication-permitted camera management applet in the IC card 40 or the loaded device.

The digital camera sends the body ID of the digital camera to the authentication-permitted camera management applet, which searches information stored in the identification information area 82 in the loaded IC card 40. If there is a body ID in the identification information area 82 that is the same as the body ID received from the digital camera, the authentication-permitted camera management applet returns a response of "ID exists" to the digital camera. If there is no body ID in the identification information area 82 that is the same as the body ID received from the digital camera, the authentication-permitted camera management applet returns a response of "no ID" to the digital camera. If the digital camera receives "ID exists" as a response, the digital camera determines that the key exists (YES in step S15), and the process proceeds to step S16. On the other hand, if the digital camera receives "no ID" as a response (NO in step S15), the process proceeds to step S21. If a communication error is detected, the process proceeds to step S25.

In step S16, the system control unit 32 obtains a key data from the IC card 40 or a device including an IC card function that is loaded in the digital camera. In order to obtain the key data, the digital camera uses a key exchange applet in the IC card 40 to send a key obtaining request to the IC card 40. The key exchange applet reads out the key data stored in the key area 80 of the IC card 40 onto the digital camera.

In step S17, the system control unit 32 sets a value indicating that the card is "invalid" to an authentication result variable. In step S18, the system control unit 32 displays the authentication status on the image display unit 28 and/or the indicator 66. Since the authentication status is "invalid", a text as illustrated in FIG. 6 is displayed. The authentication process is then ended.

In step S19, the system control unit 32 sets a value indicating that there is "no key" to the authentication result variable. In step S20, the system control unit 32 displays the authentication status on the image display unit 28 and/or the indicator 66. Since the authentication status is "no key", a text as illustrated in FIG. 7 is displayed. The authentication process is then ended.

In step S21, the system control unit 32 sets a value indicating that the digital camera is "not registered", to the authentication result variable. In step S22, the system control unit 32 displays the authentication status on the image display unit 28 and/or the indicator 66. Since the authentication status is "not registered", a text as illustrated in FIG. 8 is displayed. The authentication process is then ended.

In step S23, the system control unit 32 sets a value indicating "encryption enabled" to the authentication result variable. In step S24, the system control unit 32 displays the authentication status on the image display unit 28 and/or the indicator 66. Since the authentication status is "encryption enabled", a text as illustrated in FIG. 9 is displayed. The authentication process is then ended.

In step S25, the system control unit 32 sets a value indicating "device failure" to the authentication result variable. In step S26, the system control unit 32 displays the authentication status on the image display unit 28 and/or the indicator 66. Since the authentication status is "device failure", a text as illustrated in FIG. 10 is displayed. The authentication process is then ended.

Figure 13:
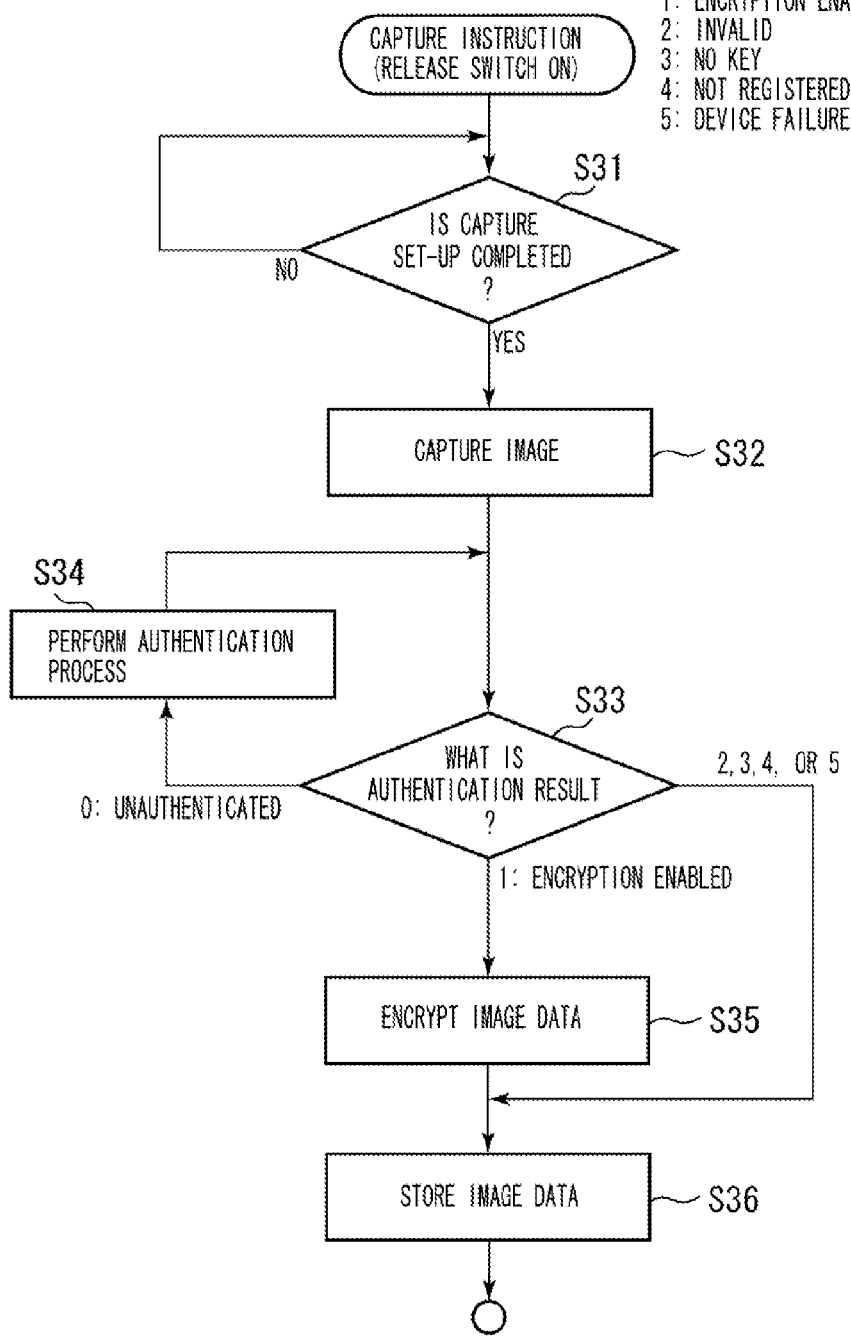
FIG. 13 is a flowchart illustrating an operation of image capturing and storing according to a first exemplary embodiment of the present invention.

FIG. 13 is a flowchart illustrating an operation of capturing and storing an image that is an image capture instruction procedure of the digital camera in the present exemplary embodiment. Generally, when a user instructs a digital camera to capture an image, an image output from an image sensor 14 is stored in the memory 26. The stored image is then compressed and recorded in the recording medium 36. In the present exemplary embodiment, an authentication process is performed before recording a captured image in the recording medium 36. If the authentication is successful, a data encryption process is further performed. Such authentication, encryption and recording processes will be described below.

In step S31, the system control unit 32 determines whether an image capture set-up is completed. To be more specific, the system control unit 32 reads a value of the capture set-up variable and determines whether the value indicates "capture set-up completed". If the capture set-up is completed (YES in step S31), the process proceeds to step S32. On the other hand, if the capture set-up is not completed (NO in step S31), the system control unit 32 waits until the capture set-up is completed. Since a value indicating "capture set-up completed" is set as the capture set-up variable in step S2 of the activation process illustrated in FIG. 11, the determination process in step S31 does not go into an infinite loop.

In step S32, the system control unit 32 performs an image capturing process by driving the shutter 12 and the image sensor 14. The A/D converter 16 converts an analog image signal output from the image sensor 14 into a digital signal, and the image processing unit 18 performs image processing such as gamma correction. The capture/display control unit 20 stores the image-processed digital image data in the image display memory 22 and the memory 26. The image data stored in the image display memory 22 is read out to the D/A converter 24 to be displayed. The image data stored in the memory 26 is compressed by the compression/decompression unit 34.

In step S33, the system control unit 32 determines an authentication result by reading a value of the authentication result variable. If the value indicates "unauthenticated" (0 in step S33), the process proceeds to step S34. If the value indicates "encryption enabled" (1 in step S33), the process proceeds to step S35. Further, if the value indicates "invalid", "no key", "not registered", or "device failure" (2, 3, 4, or 5 in step S33), the process proceeds to step S36. That is, in the present exemplary embodiment, an authentication process, storage of data after performing encryption, or storage of data without performing encryption is selected according to the authentication result, as illustrated in the above-described branching process. A capturing process (i.e., step S32) is executed according to an image capture instruction even in a case where the authentication result is "unauthenticated".

In step S34, a mutual authentication process described with reference to FIG. 12 is performed. After performing the authentication process, the authentication result is again determined in step S33.

In step S35, the system control unit 32 encrypts the image data stored in the memory 26 using the encryption/decryption unit 38.

In step S36, the system control unit 32 stores in the recording medium 36 the compressed image data that is stored in the memory 26 and that is encrypted or not encrypted. The image capturing process is thus ended.

Second Exemplary Embodiment

In a second exemplary embodiment of the present invention, a user can set a "priority mode" and an "encryption mode" to a digital camera, so that the timing of performing an authentication process can be set more precisely. The same reference numerals are assigned to components in the second exemplary embodiment that are similar to the components in the first exemplary embodiment, and description is not repeated.

Figure 14A:
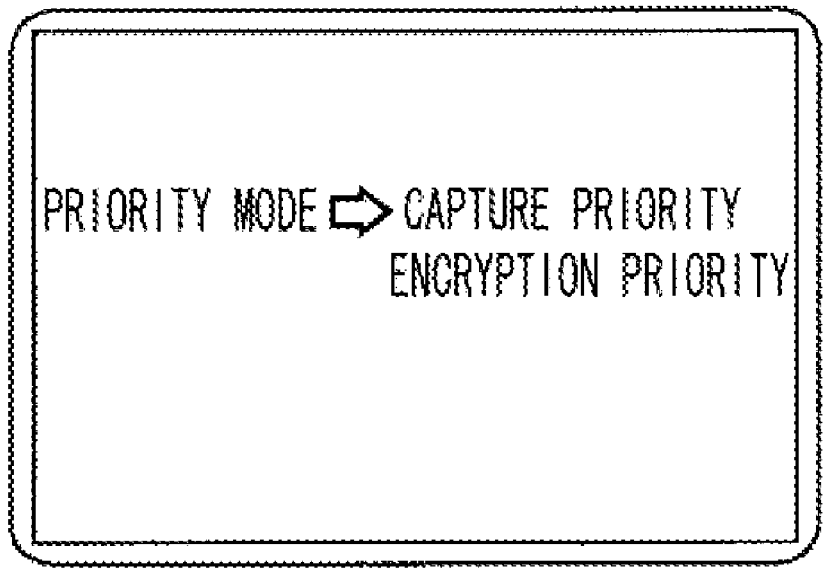
FIGS. 14A and 14B illustrate examples of screens for setting a priority mode according to a second exemplary embodiment of the present invention.
Figure 14B:
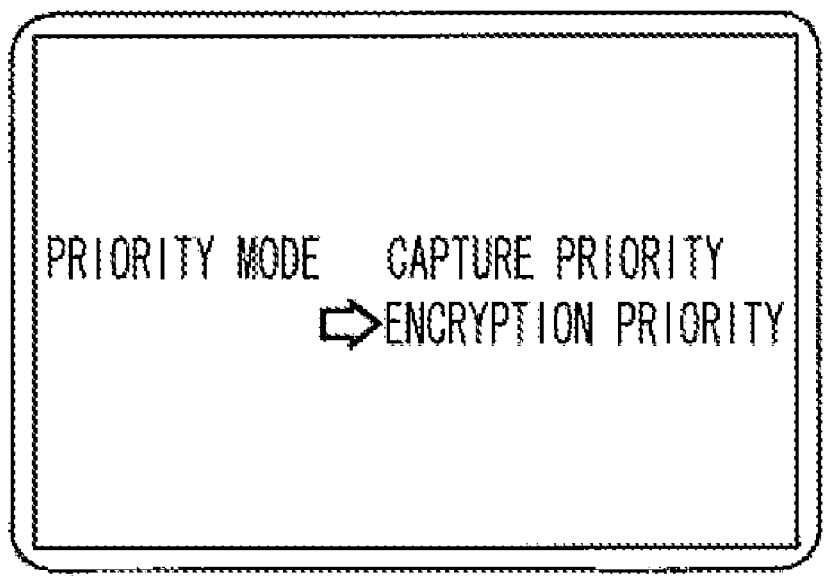

FIGS. 14A and 14B illustrate screens for setting a priority mode to a digital camera. The setting screens are displayed on the display unit 28. FIG. 14A illustrates a state in which a user selects "capture priority", and FIG. 14B illustrates a state where a user selects "encryption priority". In setting a priority mode, the user operates an operation button or an operation dial to move a pointer indicated by an arrow so that either "capture priority" or "encryption priority" is selected. A value indicating the priority mode that is set by a user is stored in the nonvolatile memory 50.

If a user selects the capture priority mode, the digital camera operates similarly as described with references to FIG. 1 to FIG. 13. That is, an image capturing process can be performed before an authentication process is performed in an activation process. As a result, an operation control can be realized in which a user will not lose a photo opportunity directly after activating the digital camera.

If a user selects the encryption priority mode, the digital camera does not perform an image capturing process in a case where the authentication process has not ended. As a result, an operation control which focuses on a higher security function can be realized.

Figure 15A:
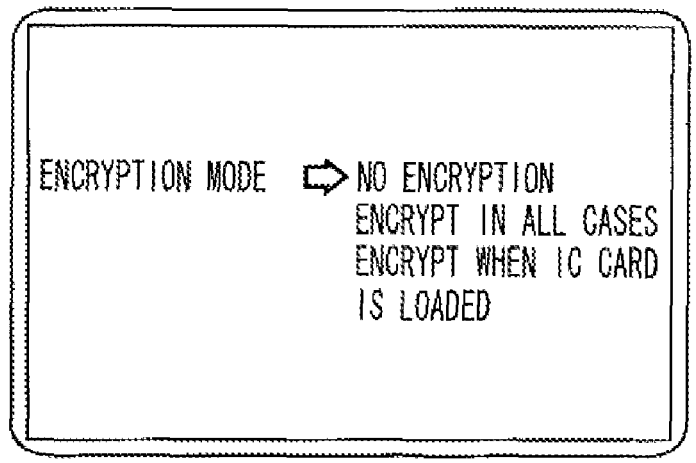
FIGS. 15A, 15B, and 15C illustrate examples of a screen for setting an encryption mode.
Figure 15B:
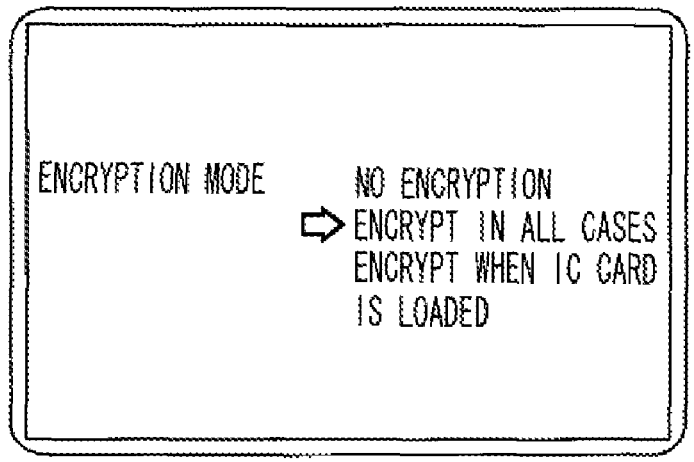
Figure 15C:
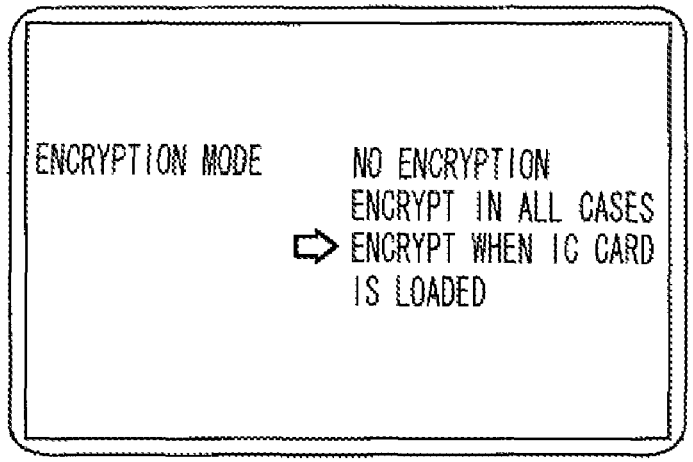

FIGS. 15A, 15B, and 15C illustrate screens that are displayed on the image display unit 28 for setting an encryption mode. FIG. 15A illustrates a screen for setting "no encryption", FIG. 15B "encrypt in all cases", and FIG. 15C "encrypt when IC card is loaded". In setting an encryption mode, a user operates an operation button or an operation dial to move a pointer indicated by an arrow so that one of "no encryption", "encrypt in all cases", and "encrypt when IC card is loaded" is selected. A value indicating an encryption mode that is set by a user is stored in the nonvolatile memory 50.

If a user sets "encrypt when IC card is loaded" as the encryption mode, an operation control can be realized in which a captured image is encrypted and recorded, or unencrypted and recorded based on the status of the IC card and whether an IC card is loaded.

If a user sets "no encryption" as the encryption mode, the captured image is recorded without being encrypted. That is, the operation control similar to a digital camera that does not include an encryption function, is performed.

If a user sets "encrypt in all cases" as the encryption mode, the captured image is always encrypted and stored. If a captured image cannot be encrypted, the image data is not stored. Consequently, an operation control which focuses on a security function can be realized. If a user does not want to store an image data that is not encrypted, the user can set the encrypted mode to "encrypt in all cases".

Figure 16:
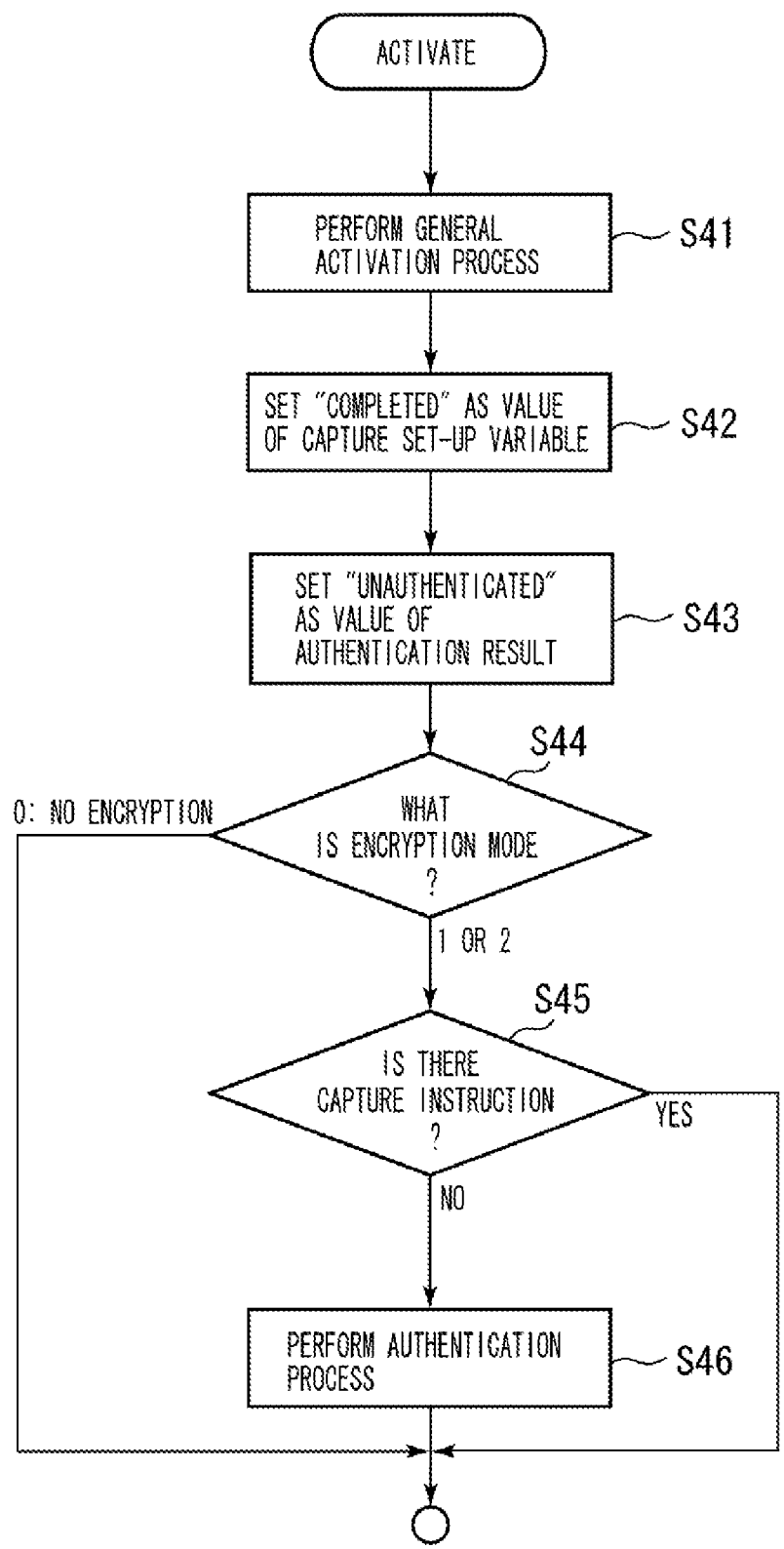
FIG. 16 is a flowchart illustrating an activation process according to a second exemplary embodiment of the present invention.

FIG. 16 is a flowchart illustrating an activation process of the digital camera showing an activation procedure in the present exemplary embodiment. An activation process is performed when a digital camera is switched on, and includes various initialization processes that are required when the digital camera transits to a state in which the digital camera can capture an image.

In step S41, the system control unit 32 executes a general activation process of a digital camera. For example, the system control unit 32 supplies power to the units illustrated in FIG. 1. The system control unit 32 activates software stored in a nonvolatile memory 50, and the software initializes various variables. Such a process is generally performed by an electronic device, e.g., the activation process performed by a general digital camera.

In step S42, the system control unit 32 sets a value indicating "completed" to a capture set-up variable which represents the status of the capture set-up. The capture set-up variable is initialized as an invalid value in step S1.

In step S43, the system control unit 32 sets a value indicating "unauthenticated" to an authentication result variable that represents an authentication result.

In step S44, the system control unit 32 determines the encryption mode by reading the value of the variable indicating the encryption mode. If a value indicating "no encryption" is set (0 in step S44), the activation process is ended. On the other hand, if a value indicating "encrypt in all cases" or "encrypt when IC card is loaded" is set (1 or 2 in step S44), the process proceeds to step S45.

In step S45, the system control unit 32 detects a value of a variable indicating whether a capture is instructed (i.e., a capture instruction variable). The capture instruction variable is initialized in step S41 with a value indicating "no capture instruction". If the value of the capture instruction variable indicates "capture instructed" (YES in step S45), the activation process is ended. On the other hand, if the value of the capture instruction variable indicates "no capture instruction" (NO in step S45), the process proceeds to step S46 to perform an authentication process.

When the process of step S42 ends, the digital camera of the present exemplary embodiment is able to capture an image, and a capturing process (illustrated in the flowchart of FIG. 17) is in an executable state as a different task or a process. Therefore, the value of the capture instruction variable can indicate "capture instructed" before performing the process of step S46.

In the authentication process performed in step S46, the digital camera of the present exemplary embodiment communicates with the IC card 40 and mutually authenticates whether the digital camera and the IC card 40 can both be used. The mutual authentication process is similar to the process described with reference to the flowchart illustrated in FIG. 12.

Figure 17:
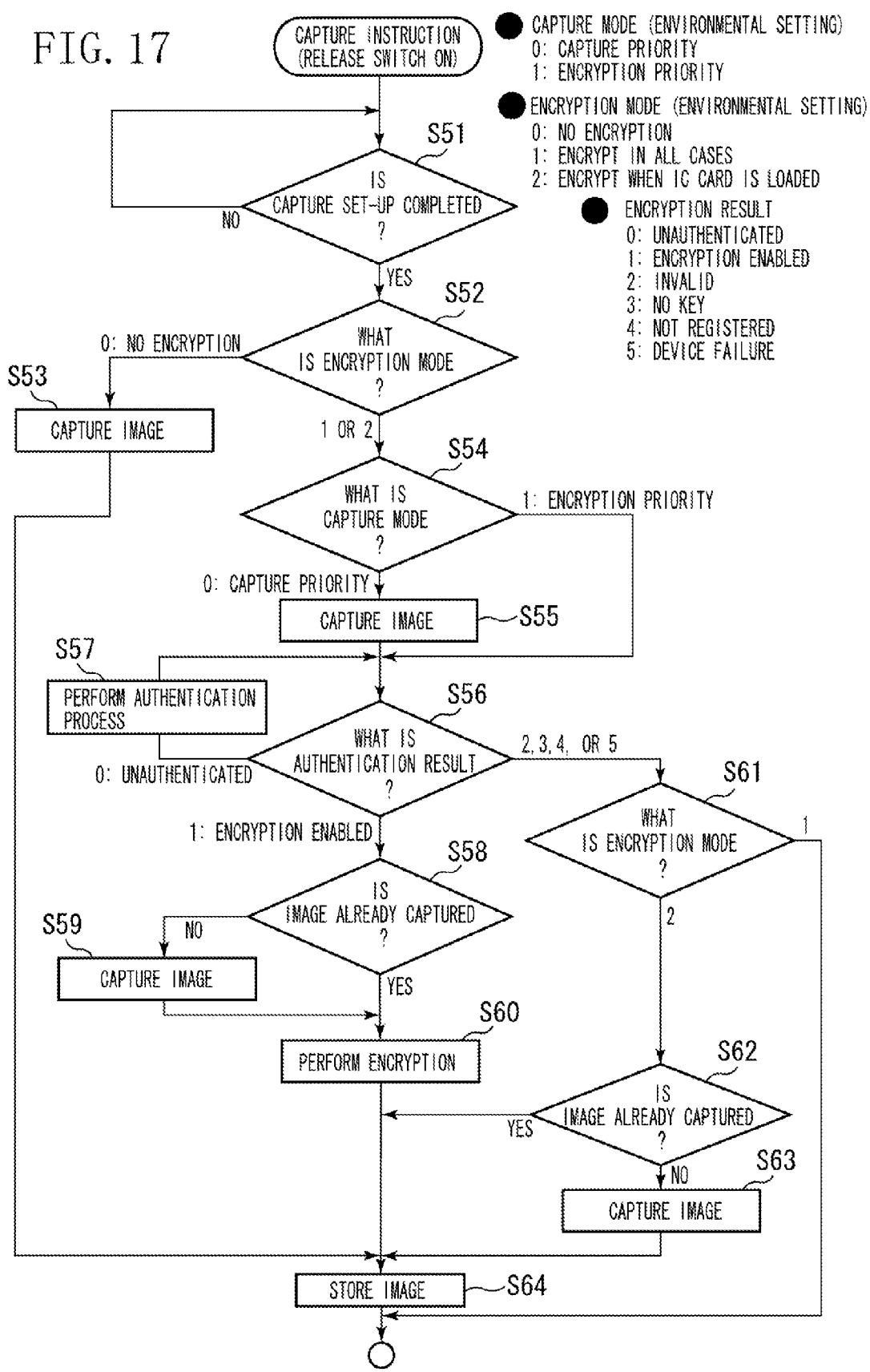
FIG. 17 is a flowchart illustrating an operation of image capturing and storing according to a second exemplary embodiment of the present invention.

FIG. 17 is a flowchart illustrating an operation of capturing and storing an image in a capture instruction procedure of the digital camera in the second exemplary embodiment. Generally, when a user instructs a digital camera to capture an image, an image output from an image sensor 14 is stored in the memory 26. The stored image is then compressed and recorded in the recording medium 36. The setting of an encryption mode, i.e., the encryption process and the authentication process prior to the encryption process will be described below.

In step S51, the system control unit 32 determines whether a capture set-up is completed. To be more specific, the system control unit 32 reads a value of the capture set-up variable and determines whether the value indicates "capture set-up completed". If the capture set-up is completed (YES in step S31), the process proceeds to step S52. On the other hand, if the capture set-up is not completed (NO in step S51), the system control unit 32 waits until the capture set-up is completed. Since a value indicating "capture set-up completed" is set to the capture set-up value in step S42 of the activation process illustrated in FIG. 16, the determination process in step S51 does not go into an infinite loop.

In step S52, the system control unit 32 determines the encryption mode. The system control unit 32 reads a value of a variable indicating the encryption mode (i.e., an encryption mode variable), and if the value indicates "no encryption"(0 in step S52), the process proceeds to step S53. On the other hand, if the value indicates "encrypt in all cases" or "encrypt when IC card is loaded" (1 or 2 in step S52), the process proceeds to step S54.

In step S53, the system control unit 32 performs a capturing process by driving the shutter 12 and the image sensor 14. The A/D converter 16 converts an analog image signal output from the image sensor 14 into a digital signal, and the image processing unit 18 performs image processing such as gamma correction. The capture/display control unit 20 stores the image-processed digital image data into the image display memory 22 and the memory 26. The image data stored in the image display memory 22 is read out to the D/A converter 24 for display. The image data stored in the memory 26 is compressed by the compression/decompression unit 34.

When the capturing process ends in step S53, in step S64, the system control unit 32 stores the compressed image data in the recording medium 36. That is, the system control unit 32 stores the compressed image data stored in the memory 26 in the recording medium 36. The capturing operation thus ends.

In step S54, the system control unit 32 determines a capturing mode by reading a value of the variable indicating a capturing mode (i.e., a capturing mode variable). If the value indicates "capturing priority" (0 in step S54), the process proceeds to step S55. On the other hand, if the value indicates "encryption priority" (1 in step S54), the process proceeds to step S56. That is, if the value indicates "capturing priority", the capturing process is performed first, and if the value indicates "encryption priority", the authentication process is performed first.

In step S55, the capturing process similar to the process described in step S53 is performed.

In step S56, the system control unit 32 determines an authentication result by reading a value of an authentication result variable. If the value indicates "unauthenticated" (0 in step S56), the process proceeds to step S57. If the value indicates "encryption enabled" (1 in step S56), the process proceeds to step S58. If the value indicates "invalid", "no key", "unregistered", or "device failure" (2, 3, 4, or 5 in step S56), the process proceeds to step S61. That is, in the present exemplary embodiment, an authentication process, encrypting and storing of data, or storing data without encryption is selected according to the authentication result, as illustrated in the above-described branching process. If the capture mode is set as "capture priority", the capturing process (step S55) is performed even in a case where the authentication is not performed.

In step S57, the system control unit 32 performs an authentication process similar to the process described in step S34. The process then proceeds to step S56 where the system control unit 32 again determines the authentication result.

In step S58, the system control unit 32 determines whether a capturing process in step S55 is already performed. If the capturing process is already performed, the digital image data is already stored in the memory 26 as described above. Therefore, it can be determined whether the capturing process is performed, according to the status of the memory 26. If a capturing process is performed (YES in step S58), the process proceeds to step S60. On the other hand, if a capturing process is not yet performed (NO in step S58), the process proceeds to step S59.

In step S59, the system control unit 32 performs a capturing process similar to the process described in step S53.

In step S60, the system control unit 32 encrypts captured image data. To be more specific, the system control unit 32 uses the encryption/decryption unit 38 to encrypt the image data stored in the memory 26.

In step S61, the system control unit 32 determines the encryption mode by reading the value of the encryption mode variable. If the value is set as "encrypt in all cases" (1 in step S61), the process of the flowchart illustrated in FIG. 17 ends. There are cases where the process ends without performing the capturing process and where a capturing process is performed and a storage process is not performed. In either case, an unencrypted image is not stored in the recording medium 36.

If the encryption mode variable indicates "encrypt when IC card is loaded" (2 in step S61), the process proceeds to step S62.

Moreover, in step S61, the value which is set to the encryption mode variable will not indicate "no encryption". That is, if the encryption mode variable is evaluated first in step S52 as "not encrypted", the process proceeds to step S53.

In step S62, the system control unit 32 determines whether the capturing process is already performed. If the capturing process is already performed, the digital image data is already stored in the memory 26. Therefore, whether the capturing process is already performed can be determined based on the status of the memory 26. If the capturing process is already performed (YES in step S62), the process proceeds to step S64. If the capturing process is not yet performed (NO in step S62), the process proceeds to step S63.

In step S63, the capturing process similar to the process performed in step S53 is performed.

In step S64, the system control unit 32 stores in the recording medium 36 a compressed image data that is encrypted or unencrypted, and stored in the memory 26. The capturing process then ends.

Third Exemplary Embodiment

In a third exemplary embodiment of the present invention, the IC card can be detached from the digital camera while the digital camera is activated. That is, an authentication process is performed according to the loading and unloading of the IC card while the digital camera is activated. In the third exemplary embodiment, components similar to those in the first and second exemplary embodiments are assigned the same reference numerals, and description is not repeated.

Figure 18:
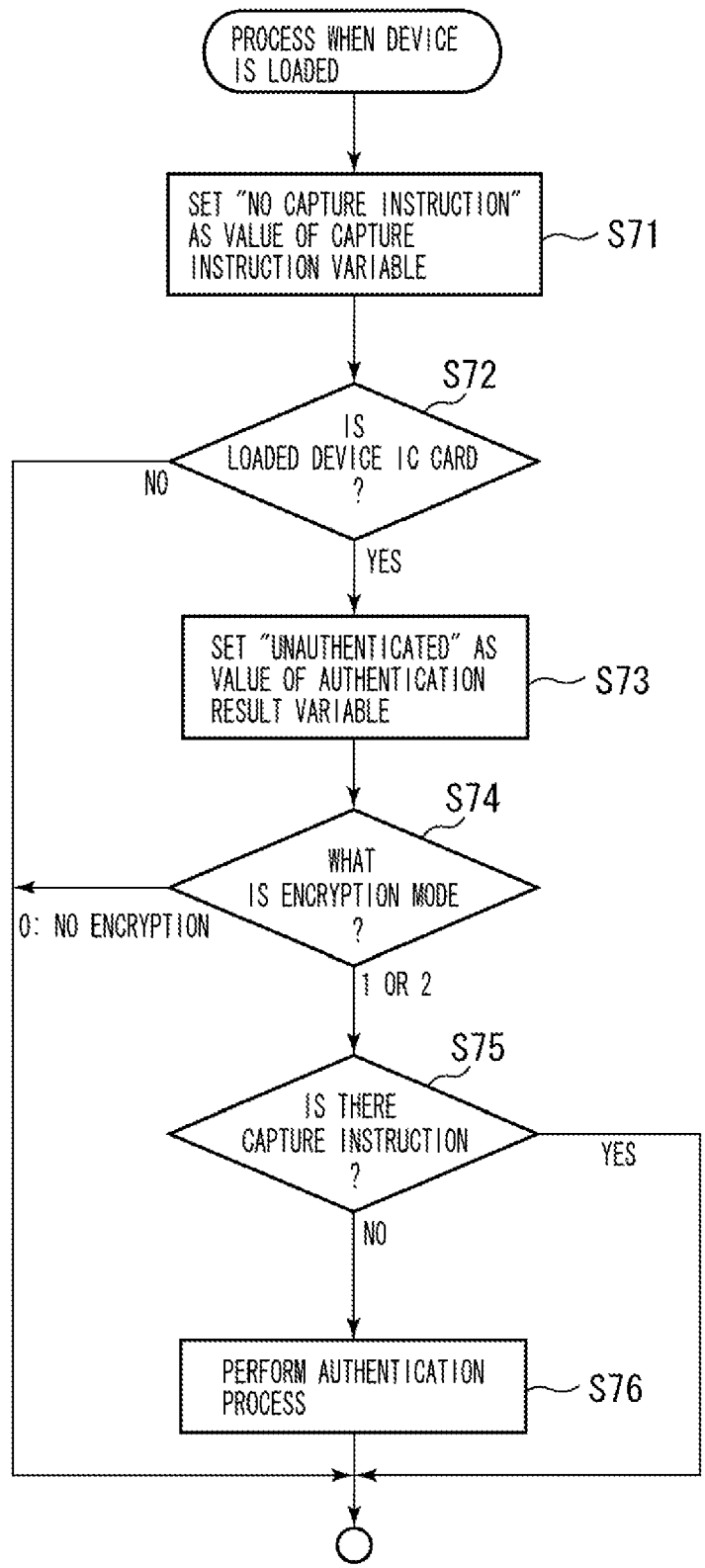
FIG. 18 is a flowchart illustrating a process performed when loading a device into a digital camera according to a third exemplary embodiment of the present invention.

FIG. 18 is a flowchart illustrating a process when a device is loaded into a digital camera.

In step S71, the system control unit 32 set a value indicating "no capture instruction" to a capture instruction value.

In step S72, the system control unit determines whether the loaded device is an IC card. If the loaded device is not an IC card (NO in step S72), the process performed when a device is loaded ends. On the other hand, if the loaded device is an IC card (YES in step S72), the process proceeds to step S73.

In step S73, the system control unit 32 sets a value indicating "not authenticated" to an authentication result variable.

In step S74, the system control unit 32 determines the encryption mode by reading the value of the encryption mode variable. If the value is set as "no encryption" (0 in step S74), the process performed when a device is loaded ends. On the other hand, if the encryption mode is set as "encrypt in all cases" or "encrypt when IC card is loaded", the process proceeds to step S75.

In step S75, the system control unit 32 determines whether there is a capture instruction. If the value of the capture instruction variable indicates "capture instructed" (YES in step S75), the device loading process ends. If the value of the capture instruction variable indicates "no capture instruction" (NO in step S75), the process proceeds to step S76. The capture instruction variable is initialized at a value indicating "no capture instruction" in step S71. However, there is a case where the value can be set as "capture instructed" by interruption. That is, the process illustrated in FIG. 13 can be performed as other task or process, and consequently, the value of the capture instruction variable is set as "capture instructed" before performing step S75.

In step S76, the system control unit 32 communicates with each other and authenticates whether the digital camera and the IC card can both be used. The authentication process is similar to the process described with reference to FIG. 12.

Figure 19:
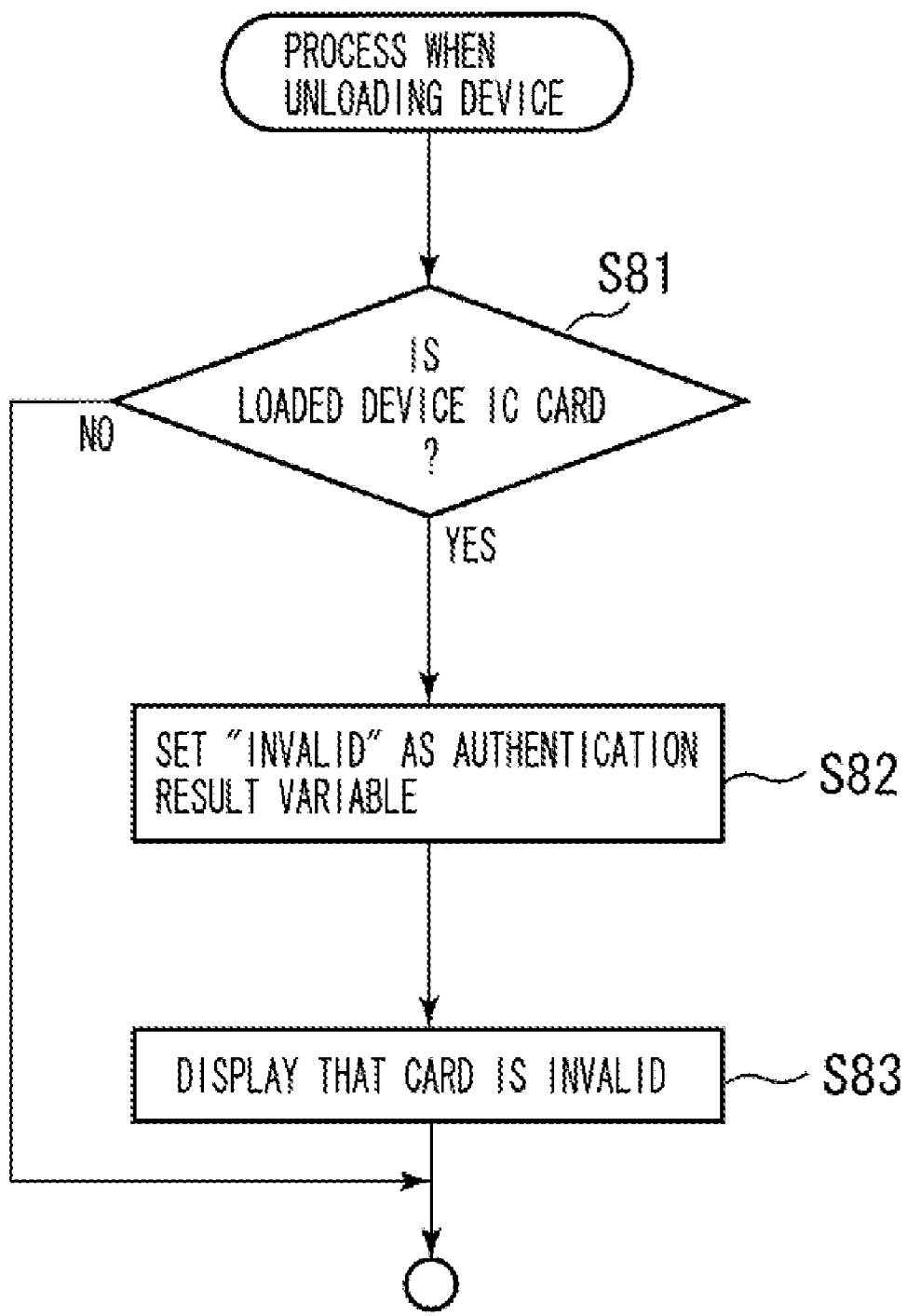
FIG. 19 is a flowchart illustrating a process performed when unloading a device from a digital camera according to a third exemplary embodiment of the present invention.

FIG. 19 is a flowchart illustrating a process that is performed when unloading a device from the digital camera.

In step S81, the system control unit 32 determines whether the unloaded device is an IC card. If the unloaded device is not an IC card (NO in step S81), the device unloading process ends. On the other hand, if the unloaded device is an IC card (YES in step S81), the process proceeds to step S82.

In step S82, the system control unit 32 sets a value indicating "invalid" to the authentication result variable.

In step S83, the system control unit 32 displays a status of the authentication on the indicator 66. Since the flowchart illustrated in FIG. 19 indicates "invalid" as the status of the authentication, the indicator displays a text as illustrated in FIG. 6.

As described above, according to the third exemplary embodiment, a digital image data or an encrypted digital image data is stored in the recording medium 36. However, the process of storing data into the recording medium 36 can be replaced with a transmission process in which a digital image data or an encrypted digital image data is transmitted to an external device such as a PC via a communication apparatus.

In the first, second, and third exemplary embodiments, a digital camera is described as an example of an image capture apparatus according to the present invention. However, an image capture apparatus according to the present invention is not limited to a digital camera, and can be applied to a digital video camera, camera-equipped portable terminal, or a camera-equipped phone.

Moreover, the various process procedures described in the first, second, and third exemplary embodiments can be realized by a computer such as a microcomputer or a personal computer according to a computer program. In such a case, the computer program which realizes all or part of the procedures described in the first and second exemplary embodiments are supplied to the computer via a network or a recording medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-040002 filed Feb. 20, 2007, which is hereby incorporated by reference herein in its entirety.

What is claimed is:

1. An image capture apparatus comprising:
    an image capture unit configured to capture an image;
    an image data generating unit configured to generate image data corresponding to the captured image;
    an authentication unit configured to perform an authentication process using an external device;
    an encryption unit configured to encrypt the image data to generate encrypted image data if the authentication process performed by the authentication unit is succeeded;
    a storage unit configured to store the encrypted image data in a recording medium; and
    a display unit configured to (a) display, when ID information of the image capture apparatus is not included in the external device, first information which is used to inform a user that the image capture apparatus is not a registered device, and (b) display, when the ID information of the image capture apparatus and encryption key data are included in the external device, second information which is used to inform the user that the authentication process performed by the authentication unit is succeeded, wherein the encryption key data is used to encrypt the image data.

2. The image capture apparatus according to claim 1, wherein the image capture apparatus comprises one of a digital camera, a digital video camera, a camera-equipped mobile terminal, and a camera-equipped phone.

3. The image capture apparatus according to claim 1, wherein the encryption unit is configured to encrypt the image data using the encryption key data obtained from the external device.

4. The image capture apparatus according to claim 1, wherein the display unit is configured to display, when the encryption key data is not included in the external device, third information which is used to inform the user that an encryption of the image data cannot be performed.

5. The image capture apparatus according to claim 1, wherein the image data is not encrypted by the encryption unit when the external device does not have the encryption key data.

6. The image capture apparatus according to claim 1, wherein the image data generating unit is configured to compress the image data before the image data is encrypted by the encryption unit.

7. A method of controlling an image capture apparatus, comprising:
    controlling an image capture unit to capture an image;
    controlling an image data generating unit to generates image data corresponding to the captured image;
    controlling an authentication unit to perform an authentication process using an external device;
    controlling an encryption unit to encrypt the image data to generate encrypted image data if the authentication process performed by the authentication unit is succeeded;
    controlling a storage unit to store the encrypted image data in a recording medium;
    controlling a display unit to display, when ID information of the image capture apparatus is not included in the external device, first information which is used to inform a user that the image capture apparatus is not a registered device; and
    controlling the display unit to display, when the ID information of the image capture apparatus and encryption key data are included in the external device, second information which is used to inform the user that the authentication process performed by the authentication unit is succeeded, wherein the encryption key data is used to encrypt the image data.

8. The method according to claim 7, wherein the image capture apparatus comprises one of a digital camera, a digital video camera, a camera-equipped mobile terminal, and a camera-equipped phone.

9. The method according to claim 7, wherein the encryption unit is configured to encrypt the image data using the encryption key data obtained from the external device.

10. The method according to claim 7, further comprising:
controlling the display unit to display, when the encryption key data is not included in the external device, third information which is used to inform the user that an encryption of the image data cannot be performed.

11. The method according to claim 7, wherein the image data is not encrypted by the encryption unit when the external device does not have the encryption key data.

12. The method according to claim 7, wherein the image data generating unit is configured to compress the image data before the image data is encrypted by the encryption unit.

* * * * *